(12) United States Patent
Shi

(10) Patent No.: US 9,740,832 B2
(45) Date of Patent: Aug. 22, 2017

(54) METHOD, APPARATUS AND SYSTEM FOR ACCESS MODE CONTROL OF A DEVICE

(71) Applicant: Apple Inc., Cupertino, CA (US)

(72) Inventor: Jianxiong Jason Shi, Pleasanton, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 14/015,512

(22) Filed: Aug. 30, 2013

(65) Prior Publication Data
US 2013/0347102 A1    Dec. 26, 2013

Related U.S. Application Data

(63) Continuation of application No. 12/842,899, filed on Jul. 23, 2010, now Pat. No. 8,528,072.

(51) Int. Cl.
*G06F 21/00* (2013.01)
*G06F 3/0488* (2013.01)
*G06F 21/36* (2013.01)

(52) U.S. Cl.
CPC .......... *G06F 21/00* (2013.01); *G06F 3/04883* (2013.01); *G06F 21/36* (2013.01)

(58) Field of Classification Search
CPC ....... G06F 21/31; G06F 21/36; G06F 3/04883
See application file for complete search history.

(56) References Cited

U.S. PATENT DOCUMENTS

| | | | |
|---|---|---|---|
| 5,465,084 A | 11/1995 | Cottrell | |
| 5,559,961 A | 9/1996 | Blonder | |
| 5,677,710 A | 10/1997 | Thompson-Rohrlich | |
| 5,821,933 A | 10/1998 | Keller et al. | |
| 5,907,327 A | 5/1999 | Ogura et al. | |
| 6,151,208 A | 11/2000 | Bartlett | |
| 6,160,555 A | 12/2000 | Kang et al. | |
| 6,192,478 B1 | 2/2001 | Elledge | |
| 6,249,606 B1 | 6/2001 | Kiraly et al. | |
| 6,323,846 B1 | 11/2001 | Westerman et al. | |

(Continued)

FOREIGN PATENT DOCUMENTS

| | | |
|---|---|---|
| CN | 1220433 A | 6/1999 |
| CN | 1685357 A | 10/2005 |

(Continued)

OTHER PUBLICATIONS

Ni et al., "DiffUser: Differentiated User Access Control on Smartphones," International Conference on Mobile Adhoc and Sensor Systems, Nov. 17, 2009, Mass '09, IEEE 6th, 6 pages.

(Continued)

*Primary Examiner* — Jeffrey Pwu
*Assistant Examiner* — Thong Truong
(74) *Attorney, Agent, or Firm* — Morrison & Foerster LLP

(57) ABSTRACT

A method, apparatus, and system for accessing at least a portion of a device based upon an access input. An access input is received. The access input includes information for gaining access to one or more functions of the device. A user access mode of the device is changed from a first access mode to a second access mode based upon at least in part on the access input. An application is selected in the device in response to changing from the first access mode to the second access mode. At least a portion of the output of the selected application is provided.

12 Claims, 10 Drawing Sheets

(56) References Cited

U.S. PATENT DOCUMENTS

| | | |
|---|---|---|
| 6,347,290 B1 | 2/2002 | Bartlett |
| 6,421,453 B1 | 7/2002 | Kanevsky et al. |
| 6,424,711 B1 | 7/2002 | Bayless et al. |
| 6,570,557 B1 | 5/2003 | Westerman et al. |
| 6,573,883 B1 | 6/2003 | Bartlett |
| 6,633,310 B1 | 10/2003 | Andrew et al. |
| 6,677,932 B1 | 1/2004 | Westerman |
| 6,709,333 B1 | 3/2004 | Bradford et al. |
| 6,720,860 B1 | 4/2004 | Narayanaswami |
| 6,735,695 B1 | 5/2004 | Gopalakrishnan et al. |
| 6,877,097 B2 | 4/2005 | Hamid et al. |
| 6,960,734 B1 | 11/2005 | Park |
| 7,124,433 B2 | 10/2006 | Little |
| 7,151,843 B2 | 12/2006 | Rui et al. |
| 7,174,462 B2 | 2/2007 | Pering et al. |
| 7,190,816 B2 | 3/2007 | Mitsuyu et al. |
| 7,236,576 B2 | 6/2007 | Schnarel et al. |
| 7,263,670 B2 | 8/2007 | Rekimoto |
| 7,286,063 B2 | 10/2007 | Gauthey et al. |
| 7,289,063 B2 | 10/2007 | Zaghloul |
| 7,395,506 B2 | 7/2008 | Tan et al. |
| 7,420,546 B2 | 9/2008 | Abdallah et al. |
| 7,480,870 B2 | 1/2009 | Anzures et al. |
| 7,593,000 B1 * | 9/2009 | Chin .................. 345/156 |
| 7,626,598 B2 | 12/2009 | Manchester |
| 7,627,904 B2 | 12/2009 | Tokkonen |
| 7,657,849 B2 | 2/2010 | Chaudhri et al. |
| 7,793,225 B2 | 9/2010 | Anzures et al. |
| 7,810,105 B2 | 10/2010 | Prabandham et al. |
| 8,006,299 B2 | 8/2011 | Suominen |
| 8,046,721 B2 | 10/2011 | Chaudhri et al. |
| 8,095,879 B2 | 1/2012 | Goetz |
| 8,209,637 B2 | 6/2012 | Chaudhri et al. |
| 8,286,103 B2 | 10/2012 | Chaudhri et al. |
| 8,352,745 B2 | 1/2013 | McKeeth |
| 8,527,903 B2 | 9/2013 | Chaudhri et al. |
| 8,528,072 B2 | 9/2013 | Shi |
| 8,627,237 B2 | 1/2014 | Chaudhri et al. |
| 8,640,057 B2 | 1/2014 | Chaudhri et al. |
| 8,694,923 B2 | 4/2014 | Chaudhri et al. |
| 8,745,544 B2 | 6/2014 | Chaudhri et al. |
| 8,782,775 B2 | 7/2014 | Fadell et al. |
| 2001/0011308 A1 | 8/2001 | Clark et al. |
| 2001/0012022 A1 | 8/2001 | Smith |
| 2002/0015024 A1 | 2/2002 | Westerman et al. |
| 2002/0191029 A1 | 12/2002 | Gillespie et al. |
| 2002/0196274 A1 | 12/2002 | Comfort et al. |
| 2003/0115490 A1 | 6/2003 | Russo et al. |
| 2003/0120934 A1 | 6/2003 | Ortiz |
| 2003/0142138 A1 | 7/2003 | Brown et al. |
| 2003/0163710 A1 | 8/2003 | Ortiz et al. |
| 2003/0206202 A1 | 11/2003 | Moriya |
| 2003/0222913 A1 | 12/2003 | Mattila et al. |
| 2004/0030934 A1 | 2/2004 | Mizoguchi et al. |
| 2004/0034801 A1 | 2/2004 | Jaeger |
| 2004/0042542 A1 | 3/2004 | Kawada et al. |
| 2004/0085351 A1 | 5/2004 | Tokkonen |
| 2004/0088564 A1 | 5/2004 | Norman |
| 2004/0088568 A1 | 5/2004 | Tokkonen |
| 2004/0113819 A1 | 6/2004 | Gauthey et al. |
| 2004/0135801 A1 | 7/2004 | Thompson et al. |
| 2004/0230843 A1 | 11/2004 | Jansen |
| 2004/0250138 A1 | 12/2004 | Schneider |
| 2004/0260955 A1 | 12/2004 | Mantyla |
| 2004/0268267 A1 | 12/2004 | Moravcsik |
| 2005/0050477 A1 | 3/2005 | Robertson et al. |
| 2005/0058438 A1 | 3/2005 | Hayashi |
| 2005/0060554 A1 | 3/2005 | O'Donoghue |
| 2005/0071635 A1 | 3/2005 | Furuyama |
| 2005/0079896 A1 | 4/2005 | Kokko et al. |
| 2005/0206501 A1 | 9/2005 | Farhat |
| 2005/0212760 A1 | 9/2005 | Marvit et al. |
| 2005/0216862 A1 | 9/2005 | Shinohara et al. |
| 2005/0216867 A1 | 9/2005 | Marvit et al. |
| 2005/0221798 A1 | 10/2005 | Sengupta et al. |
| 2005/0248542 A1 | 11/2005 | Sawanobori |
| 2005/0253817 A1 | 11/2005 | Rytivaara et al. |
| 2005/0264833 A1 | 12/2005 | Hiraoka et al. |
| 2005/0289476 A1 | 12/2005 | Tokkonen |
| 2006/0031776 A1 | 2/2006 | Glein et al. |
| 2006/0095369 A1 | 5/2006 | Hofi |
| 2006/0136087 A1 | 6/2006 | Higashiura |
| 2006/0136734 A1 | 6/2006 | Telek et al. |
| 2006/0161870 A1 | 7/2006 | Hotelling et al. |
| 2006/0174339 A1 | 8/2006 | Tao |
| 2006/0267955 A1 | 11/2006 | Hino |
| 2006/0289638 A1 | 12/2006 | Schilling |
| 2007/0109274 A1 | 5/2007 | Reynolds |
| 2007/0110287 A1 | 5/2007 | Kim et al. |
| 2007/0150826 A1 | 6/2007 | Anzures et al. |
| 2007/0150842 A1 | 6/2007 | Chaudhri et al. |
| 2007/0220273 A1 | 9/2007 | Campisi |
| 2007/0236330 A1 | 10/2007 | Cho et al. |
| 2007/0236475 A1 | 10/2007 | Wherry |
| 2007/0273658 A1 | 11/2007 | Yli-Nokari et al. |
| 2007/0300140 A1 | 12/2007 | Makela et al. |
| 2008/0034292 A1 | 2/2008 | Brunner et al. |
| 2008/0034307 A1 | 2/2008 | Cisler et al. |
| 2008/0042979 A1 | 2/2008 | Nikbin |
| 2008/0042983 A1 | 2/2008 | Kim et al. |
| 2008/0055263 A1 | 3/2008 | Lemay et al. |
| 2008/0055269 A1 | 3/2008 | Lemay et al. |
| 2008/0069412 A1 | 3/2008 | Champagne et al. |
| 2008/0072172 A1 | 3/2008 | Shinohara et al. |
| 2008/0082934 A1 | 4/2008 | Kocienda et al. |
| 2008/0094371 A1 | 4/2008 | Forstall et al. |
| 2008/0122796 A1 | 5/2008 | Jobs et al. |
| 2008/0134170 A1 | 6/2008 | Astheimer |
| 2008/0168075 A1 | 7/2008 | Kamiyabu |
| 2008/0168290 A1 | 7/2008 | Jobs et al. |
| 2008/0178283 A1 | 7/2008 | Pratt et al. |
| 2009/0005165 A1 | 1/2009 | Arezina et al. |
| 2009/0006846 A1 | 1/2009 | Rosenblatt |
| 2009/0006991 A1 * | 1/2009 | Lindberg et al. .............. 715/763 |
| 2009/0007017 A1 | 1/2009 | Anzures et al. |
| 2009/0043180 A1 | 2/2009 | Tschautscher et al. |
| 2009/0063352 A1 | 3/2009 | Kaufman |
| 2009/0064055 A1 | 3/2009 | Chaudhri et al. |
| 2009/0074255 A1 | 3/2009 | Holm |
| 2009/0128581 A1 | 5/2009 | Brid et al. |
| 2009/0153474 A1 | 6/2009 | Quennesson |
| 2009/0169070 A1 | 7/2009 | Fadell |
| 2009/0201257 A1 | 8/2009 | Saitoh et al. |
| 2009/0215497 A1 | 8/2009 | Louch |
| 2009/0241072 A1 | 9/2009 | Chaudhri et al. |
| 2009/0284482 A1 | 11/2009 | Chin |
| 2009/0328162 A1 | 12/2009 | Kokumai et al. |
| 2010/0053301 A1 | 3/2010 | Ryu et al. |
| 2010/0076823 A1 | 3/2010 | Feldman et al. |
| 2010/0079380 A1 | 4/2010 | Nurmi |
| 2010/0134248 A1 | 6/2010 | Adams et al. |
| 2010/0162180 A1 | 6/2010 | Dunnam et al. |
| 2010/0164684 A1 | 7/2010 | Sasa et al. |
| 2010/0225607 A1 | 9/2010 | Kim |
| 2010/0235732 A1 | 9/2010 | Bergman |
| 2010/0245553 A1 | 9/2010 | Schuler et al. |
| 2010/0306718 A1 | 12/2010 | Shim et al. |
| 2011/0010672 A1 | 1/2011 | Hope |
| 2011/0013813 A1 | 1/2011 | Yamamoto et al. |
| 2011/0170750 A1 | 7/2011 | Kropp et al. |
| 2011/0283241 A1 | 11/2011 | Miller et al. |
| 2011/0285648 A1 | 11/2011 | Simon |
| 2012/0009896 A1 | 1/2012 | Bandyopadhyay et al. |
| 2012/0021724 A1 | 1/2012 | Olsen et al. |
| 2012/0023458 A1 | 1/2012 | Chaudhri et al. |
| 2012/0047574 A1 | 2/2012 | Kim et al. |
| 2012/0182226 A1 | 7/2012 | Tuli |
| 2012/0188206 A1 | 7/2012 | Sparf et al. |
| 2012/0293438 A1 | 11/2012 | Chaudhri et al. |
| 2015/0082252 A1 | 3/2015 | Chaudhri et al. |

(56) References Cited

U.S. PATENT DOCUMENTS

FOREIGN PATENT DOCUMENTS

| | | |
|---|---|---|
| CN | 1836397 A | 9/2006 |
| CN | 100999961 A | 7/2007 |
| EP | 0328084 A2 | 8/1989 |
| EP | 1 284 450 A2 | 2/2003 |
| EP | 2 060 970 A1 | 5/2009 |
| GB | 2 313 460 A | 11/1997 |
| JP | 60 171560 | 9/1985 |
| JP | 02 249062 | 10/1990 |
| JP | 4-158434 A | 6/1992 |
| JP | 05 127819 | 5/1993 |
| JP | 06 214954 | 8/1994 |
| JP | 07 084661 | 3/1995 |
| JP | 7-84661 B2 | 9/1995 |
| JP | 8-263214 A | 10/1996 |
| JP | 08 263215 | 10/1996 |
| JP | 09 018566 | 1/1997 |
| JP | 9-18566 A | 1/1997 |
| JP | 9-128208 A | 5/1997 |
| JP | 9-221950 A | 8/1997 |
| JP | 10-69346 A | 3/1998 |
| JP | 11 203045 | 7/1999 |
| JP | 2000-181436 A | 6/2000 |
| JP | 2000 322199 | 11/2000 |
| JP | 2000 349886 | 12/2000 |
| JP | 2003-67343 A | 3/2003 |
| JP | 2003-85540 A | 3/2003 |
| JP | 2003 091370 | 3/2003 |
| JP | 2004 252720 | 9/2004 |
| JP | 2004-532477 A | 10/2004 |
| JP | 2004 348599 | 12/2004 |
| JP | 2004-348600 A | 12/2004 |
| JP | 2004-348601 A | 12/2004 |
| JP | 2005-4490 A | 1/2005 |
| JP | 2005 071008 | 3/2005 |
| JP | 2005 167455 A | 6/2005 |
| JP | 2007-71008 A | 3/2007 |
| TW | M317045 U | 8/2007 |
| WO | 00/31560 A2 | 6/2000 |
| WO | WO 01/77792 A2 | 10/2001 |
| WO | WO 02/33882 A1 | 4/2002 |
| WO | 02/093542 A1 | 11/2002 |
| WO | WO 03/038569 A2 | 5/2003 |
| WO | WO 04/001560 A1 | 12/2003 |
| WO | WO 2004/021108 A2 | 3/2004 |
| WO | WO 2005/041020 A1 | 5/2005 |

OTHER PUBLICATIONS

Office Action dated Aug. 5, 2013, received in Indian Patent Application No. 3347/CHENP/2008, which corresponds to U.S. Appl. No. 11/322,549, 2 pages (Chaudhri).

Notice of Allowance dated Jul. 5, 2013, received in Japanese Patent Application No. 2013-101691, which corresponds to U.S. Appl. No. 11/322,549 4 pages (Chaudhri).

Office Action dated Aug. 8, 2013, received in Korean Patent Application No. 10-2009-701994, which corresponds to U.S. Appl. No. 11/322,549, 1 page (Chaudhri).

Notice of Allowance dated Aug. 16, 2013, received in U.S. Appl. No. 13/563,663, 14 pages (Chaudhri).

Notice of Allowance, dated Jun. 25, 2013, received in U.S. Appl. No. 13/787,712, 16 pages (Chaudhri).

Notice of Allowance dated Sep. 5, 2013 received in U.S. Appl. No. 13/787,716, 16 pages (Chaudhri).

Notice of Allowance dated Jun. 17, 2013, received in U.S. Appl. No. 13/791,799, 16 pages (Chaudhri).

Notice of Allowance dated Oct. 30, 2013, received in U.S. Appl. No. 13/791,799, 12 pages (Chaudhri).

Office Action dated Sep. 11, 2013, received in U.S. Appl. No. 13/791,808, 21 pages (Chaudhri).

Notice of Allowance dated May 2, 2013, received in U.S. Appl. No. 12/842,899, 11 pages (Shi).

Office Action dated Oct. 17, 2013, received in U.S. Appl. No. 12/207,370, 24 pages (Fadell).

Bardram, J., "The trouble with login: on usability and computer security in ubiquitous computing," Centre for Pervasive Healthcare, Department of Computer Science, University of Aahus, Denmark, Published online: Jul. 23, 2005, 11 pages.

Baudisch, P., "Phosphor, Explaining Transitions in the User Interface Using Afterglow Effects," 2006, 10 pages.

DailyTech,"Neonode Patented Swipe-to-Unlock 3 Years Before Apple," dailytech.com, http://www.dailytech.com/Analysis+Neonode+Patented+SwipetoUnlock+3+Years+Before+Apple, Feb. 20, 2012, 4 pages.

Fitzpatrick et al., "Method for Access Control via Gestural Verification," IBM Technical Disclosure Bulletin, vol. 36, No. 09B, Sep. 1993, 2 pages.

GridLock (Palm OS), "Graphical Security System for Your Palm," Softonic, Oct. 8, 2003, 2 pages, http://gridlock.en.softonic.com/palm.

Horry et al., "A Passive-Style Buttonless Mobile Terminal," IEEE Transactions on Consumer Electronics, vol. 49, No. 3, Aug. 2003, 6 pages.

IBM, "Touch Pad Authentication," Sep. 21, 2004, 2 pages.

Jansen, W., "Authenticating Users on Handheld Devices," The National Institute of Standards and Technology, Gaithersburg Maryland, 2003, 13 pages.

Jermyn et al., "The Design and Analysis of Graphical Passwords,"© 1999 by The USENIX Association, 15 pages.

JGUI Professional, "Touch Password Protection," printed Dec. 30, 2005, 4 pages, http://www.jgui.net/touch/index.html.

McLean et al., "Access/Control Icons (Icon Keys)," IBM Technical Disclosure Bulletin, vol. 38, No. 04, Apr. 1995, 3 pages.

Monrose, N., "Towards Stronger User Authentication," Ph.d dissertation, 1999, New York University, vol. 60/05-B of Dissertation Abstract International, Order No. AAD99-30229, 128 pages.

Najjar, L., "Graphical Passwords," International Technology Disclosures vol. 10, No. 1, Jan. 25, 1992, 1 page.

Neonode, Inc., "Welcome to the N1 Guide," neonode.com, Jul. 2004, 42 pages, http://www.ebookspdf.com/gadget/2818/neonode-n1m-manual/.

Neonode "N1 Quick Start Guide," Neonode.com, Apr. 5, 2005, 24 pages, http://www.neonode.com/upload/DOCUMENTS/_EN/N1_Quick_Start_Guide.pdf.

Plaisant et all., "Touchscreen Toggle Design," Proceedings of the Conference on Human Factors in Computing Systems Addison Wesley, US, May 3, 1992, 2 pages.

Renaud et al., "My password is here! An investigation into visuo-spatial authentication mechanisms," Interacting with Computers, vol. 16, © 2004 Elsevier B.V., 25 pages, www.sciencedirect.com.

Translation of German Nullity Action Complaint against EP Patent 1 964 022 (DE No. 60 2006 012 876.2), filed Dec. 15, 2010, 37 pages.

Wiedenbeck et al. "PassPoints: Design and longitudinal evaluation of a graphical password system," International Journal of Human-Computer Studies, vol. 63, © 2005 Elsevier Ltd., 26 pages, www.sciencedirect.com.

Statement on the preliminary opinion in the matter of *Motorola Mobility Germany GmbH* vs *Apple Inc.*, Feb. 21, 2013, together with Exhibits NK 11-NK 18, 156 pages.

Samsung response dated Feb. 21, 2013, to Court's notification in the matter of *Samsung Electronics GmbH* vs *Apple Inc.*, 6 pages.

*HTC Europe Co. Ltd.* vs. *Apple Inc.* Nullity Reply Brief dated Nov. 8, 2012, 17 pages.

*Samsung Electronics GmbH* vs. *Apple Inc.*, Second reply brief dated Nov. 19, 2012, together with exhibits D12-D21 and D25, 269 pages.

*Samsung Electronics GmbH* vs. *Apple Inc.*, Supplement to the cancellation request, dated Mar. 1, 2013, together with Exhibits D26-D32, 211 pages.

Grant of application dated May 25, 2013, in Japanese Patent Application No. 2012-091352, which corresponds to U.S. Appl. No. 11/322,549, 3 pages (Chaudhri).

(56) References Cited

OTHER PUBLICATIONS

Office Action dated Mar. 11, 2013, in Japanese Patent Application No. 2013-007818, which corresponds to U.S. Appl. No. 11/322,549, 5 pages (Christie).
Grant of application dated May 31, 2013, in Japanese Patent Application No. 2013-007818, which corresponds to U.S. Appl. No. 11/322,549, 4 pages (Chaudhri).
European Search Report dated Oct. 13, 2009, in European Patent Application No. 09170574.9 which corresponds to U.S. Appl. No. 11/322,549 (Chaudhri).
Extended European Search Report dated Feb. 7, 2011, in European Patent Application No. 10 194 359.5, which corresponds to U.S. Appl. No. 11/322,549 (Chaudhri).
International Search Report and Written Opinion dated May 25, 2007, in International Application No. PCT/US2006/061370, which corresponds to U.S. Appl. No. 11/322,549 (Chaudhri).
International Search Report and Written Opinion dated Apr. 23, 2007, in International Application No. PCT/US2006/061380, which corresponds to U.S. Appl. No. 11/322,550 (Anzures).
Office Action dated Feb. 7, 2008, received in U.S. Appl. No. 11/322,549, 28 pages (Chaudhri).
Office Action dated Sep. 26. 2008, received in U.S. Appl. No. 11/322,549, 32 pages (Chaudhri).
Final Office Action dated Mar. 23, 2009, received in U.S. Appl. No. 11/322,549, 40 pages (Chaudhri).
Notice of Allowance dated Aug. 10, 2009, received in U.S. Appl. No. 11/322,549, 9 pages (Chaudhri).
Office Action dated Jul. 20, 2011, received in Austraiian Patent Application No. 2010200661, which corresoonds to U.S. Appl. No. 11/322,549 2 pages (Chaudhri).
Notice of Acceptance dated Aug. 2, 2012, received in Australian Patent Application No. 2010200661, which corresponds to U.S. Appl. No. 11/322,549, 3 pages (Chaudhri).
Office Action dated Oct. 26, 2011, received in Australian Patent Application No. 2011101192, which corresponds to U.S. Appl. No. 11/322,549, 2 pages (Chaudhri).
Certification dated Apr. 12, 2012, of Australian Patent No. 2011101192, which corresponds to U.S. Appl. No. 11/322,549, 1 page (Chaudhri).
Office Action dated Oct. 26, 2011, received in Australian Patent Application No. 2011101193, which corresponds to U.S. Appl. No. 11/322,549, 2 pages (Chaudhri).
Certification dated Apr. 23, 2012, of Austraiian Patent Application No. 2011101193, which corresponds to U.S. Appl. No. 11/322,549, 1 page (Chaudhri).
Office Action dated Feb. 5, 2010, received in Chinese Application for Invention No. 200680052770.4, which corresponds to U.S. Appl. No. 11/322,549, 4 pages (Chaudhri).
Office Action dated Jul. 26, 2011, received in Chinese Patent Application No. 200910175855.7, which corresponds to U.S. Appl. No. 11/322,549, 8 pages (Chaudhri).
Office Action dated Jul. 4, 2012, received in Chinese Patent Application No. 200910175855.7, which corresponds to U.S. Appl. No. 11/322,549, 9 pages (Chaudhri).
Office Action dated Feb. 4, 2009, received in German Patent Application No. 11 2006 003 515.0-53 which corresponds to U.S. Appl. No. 11/322,549, 6 pages (Chaudhri)
Office Action dated Feb. 9, 2010, received in German Patent Application No. 11 2006 003 515.0, which corresponds to U.S. Appl. No. 11/322,549, 6 pages (Chaudhri).
Office Action dated Mar. 25, 2009, received in the European patent application 06 846 405.6, which corresponds to U.S. Appl. No. 11/322,549, 6 pages (Chaudhri).
Office Acton dated Apr. 22, 2011, received in Japanese Patent Application No. 2008-547675, which corresponds to U.S. Appl. No. 11/322,549, 3 pages (Chaudhri).
Office Action dated Nov. 4, 2011, received in Japanese Patent Application No. 2008-547675, which corresponds to U.S. Appl. No. 11/322,549, 3 pages (Chaudhri).
Office Action dated Sep. 18, 2012, received in Japanese Patent Application No. 2008 547675, which corresponds to U.S. Appl. No. 11/322,549, 2 pages (Chaudhri).
Office Action dated Mar. 5, 2010, received in Korean Patent Application No. 10-2008-7018109, which corresponds to U.S. Appl. No. 11/322,549, 7 pages (Chaudhri).
Office Action dated Oct. 31 2007, received in U.S. Appl. No. 11/322,550, 23 pages (Anzures).
Office Action dated Apr. 21, 2008 received in, U.S. Appl. No. 11/322,550, 22 pages (Anzures)
Notice of Allowance dated Sep. 19, 2008, received in U.S. Appl. No. 11/322,550, 8 pages (Anzures).
Office Action dated Jul. 24, 2009, received in U.S. Appl. No. 12/345,584, 11 pages (Anzures).
Office Action dated Nov. 16, 2009, received in U.S. Appl. No. 12/345,584, 17 pages (Anzures).
Notice of Allowance dated Jun. 3, 2010, received in U.S. Appl. No. 12/345,584, 9 pages (Anzures).
Office Action mailed Jan. 29, 2010, received in U.S. Appl. No. 12/477,075, 18 pages (Chaudhri).
Office Action dated Sep. 17, 2010, received in U.S. Appl. No. 12/477,075, 9 pages (Chaudhri).
Office Action dated Feb. 7, 2011, received in U.S. Appl. No. 12/477,075, 10 pages (Chaudhri).
Notice of Allowance dated Aug. 10, 2011, received in U.S. Appl. No. 12/477,075, 12 pages (Chaudhri).
Office Action dated Jan. 6, 2012, received in U.S. Appl. No. 13/204,572, 15 pages (Chaudhri).
Notice of Allowance dated Jun. 12, 2012, received in U.S Appl. No. 13/204,572, 9 pages (Chaudhri).
Office Action dated Nov. 25, 2011, received in U.S. Appl. No. 12/250,659 (Chaudhri).
Notice of Allowance dated May 11, 2012, received in U.S. Appl. No. 13/250,659, 15 pages (Chaudhri).
Office Action dated Nov. 19, 2012, received in U.S. Appl. No. 13/563,663, 16 pages (Chaudhri).
Office Action for Australian Patent Application No. 2012254900, issued on May 29, 2015, 4 pages.
"N1 Quick Start Guide", Available from Internet Archive Wayback Machine at: "http://www.neonode.com/upload/DOCUMENTS/_EN/N1_Quick_Start_Guide.pdf", Apr. 5, 2005, 25 pages.
Office Action Received for European Patent Application No. 09170574.9, mailed on May 26, 2010, 1 page.
Office Action received for Taiwan Patent Application No. 097134592, mailed on Apr. 12, 2013, 8 pages (English Translation only).
Office Action in Korean Patent Application No. 10-2008-7018109, mailed on Mar. 5, 2010, 7 pages.
Office Action for Korean Patent Application No. 10-2009-7011994, mailed on Feb. 25, 2015, 8 pages (3 pages of English Translation and 5 pages of Official Copy).
Office Action in German Patent Application No. 112006003515.0, mailed on Feb. 9, 2010, 6 pages.
Final Office Action for U.S. Appl. No. 12/207,370, mailed on Dec. 13, 2011, 15 pages.
Final Office Action received for U.S. Appl. No. 12/207,370, mailed on Feb. 15, 2013, 17 pages.
Non-Final Office Action for U.S. Appl. No. 12/207,370, mailed on Aug. 2, 2012, 16 pages.
Non-Final Office Action for U.S. Appl. No. 12/207,370, mailed on May 6, 2011, 15 pages.
Notice of Allowance for U.S. Appl. No. 12/207,370, mailed on Jun. 7, 2013, 9 pages.
Notice of Allowance for U.S. Appl. No. 12/207,370, mailed on Mar. 6, 2014, 5 pages.
Supplemental Notice of Allowance for U.S. Appl. No. 12/207,370, mailed on Aug. 8, 2013, 2 pages.
Non Final Office Action for U.S. Appl. No. 12/477,075, mailed on Jan. 29, 2010, 13 pages.
Final Office Action for U.S. Appl. No. 12/842,899, mailed on Nov. 23, 2012, 12 pages.
Non-Final Office Action for U.S. Appl. No. 12/842,899, mailed on May 29, 2012, 16 pages.

(56) References Cited

OTHER PUBLICATIONS

Notice of Allowance for U.S. Appl. No. 13/563,663, mailed on Dec. 13, 2013, 11 pages.
Notice of Allowance for U.S. Appl. No. 13/791,799, mailed on Apr. 1, 2014, 9 pages.
Notice of Allowance for U.S. Appl. No. 13/791,799, mailed on Jan. 21, 2014, 9 pages.
Notice of Allowance for U.S. Appl. No. 13/791,808, mailed on Feb. 3, 2014, 9 pages.
Office Action in Japanese Patent Application No. 2008-547675, mailed on Apr. 22, 2011, 3 pages.
Office Action for Chinese Patent Application No. 200880108306.1, mailed on Aug. 9, 2012, 13 pages (English Translation only).
Office Action for Chinese Patent Application No. 200880108306.1, mailed on Jan. 15, 2013, 14 pages (English Translation only).
Office Action for Japanese Patent Application No. 2010-525891, received on Jan. 8, 2013, 4 pages (English Translation only).
Office Action for Australian Patent Application No. 2012200716, mailed on Oct. 16, 2012, 4 pages.
Office Action for Australian Patent Application No. 2012254900, mailed on Nov. 28, 2013, 3 pages.
Office Action for Japanese Patent Application No. 2013-007818, mailed on Mar. 11, 2013, 10 pages (5 pages of English Translation and 5 pages of Official Copy).
International Preliminary Report on Patentability for PCT Patent Application No. PCT/US2006/061370, issued on Jun. 24, 2008, 7 pages.
International Preliminary Report on Patentability for PCT Patent Application No. PCT/US2006/061380, issued on Jun. 24, 2008, 6 pages.
Plaisant et al., "Touchscreen Toggle Switches: Push or slide? Design Issues and Usability Study", Technical Report CAR-TR-521, CS-TR-2557, Nov. 1990, 11 pages.
Notice of Allowance for Korean Patent Application No. 1020097011994, issued on Nov. 27, 2015, 4 pages (1 page of English Translation and 3 pages of Official Copy).
Notice of Allowance for Korean Patent Application No. 10-2014-7028441, issued on Dec. 23, 2015, 4 pages (1 page of English Translation and 3 pages of Official Copy).
Office Action for Korean Patent Application No. 10-2014-7028441, mailed on Feb. 3, 2015, 7 pages (3 pages of English Translation and 4 pages of Office Action).
Notice of allowance for Korean Patent Application No. 10-2014-7033017, issued on Dec. 23, 2015, 4 pages (1 pages of English Translation and 3 pages of Official Copy).
Decision to Grant for European Patent Application No. 06846405.6, mailed on Feb. 11, 2010, 2 pages.
Intention to Grant for European Patent Application No. 06846405.6, mailed on Aug. 28, 2009, 4 pages.
Office Action for European Patent Application No. 09170574.9, mailed on Aug. 18, 2015, 6 pages.
Office Action for European Patent Application No. 10194359.5, mailed on Aug. 18, 2015, 6 pages.
Office Action for Chinese Patent Application No. 200910175855.7, mailed on Aug. 5, 2015, 18 pages (10 pages English Translation and 8 pages of Official Copy only).
Notice of Acceptance for Australian Patent Application No. 2012254900, mailed on Jul. 30, 2015, 2 pages.
Office Action received for Korean Patent Application No. 10-2014-7033017, mailed on Jun. 24, 2015, 8 pages (3 pages of English Translation and 5 pages of Official copy).
"Neonode N1m", available online at: http://www.gsmarena.com/neonode_n1m-pictures-1137.php, 4 pages.
Office Action for European Patent Application No. 09170574.9, mailed on May 3, 2016, 6 pages.
Office Action for Korean Patent Application No. 10-2016-7005576, mailed on May 20, 2016, 9 pages (4 pages of English Translation and 5 pages of Official Copy).
Kotov, Anton, "Review GSM phone Neonode N1m", available at http://web.archive.org/web/20050730004341/http://www.mobile-review.com/review/neonode-n1m-en.shtml, 18 pages.
Plaisant et al., "Touchscreen Toggle Switches: Push or Slide? Design Issues and Usability Study", available online at: http://hcil2.cs.umd.edu/trs/90-08/90-08.pdf, Nov. 1990, 11 pages.
Office Action received for Chinese Patent Application No. 200910175855.7, mailed on Sep. 26, 2016, 6 pages (3 pages of English translation and 3 pages of Official Copy).

\* cited by examiner

METHOD, APPARATUS AND SYSTEM FOR ACCESS MODE CONTROL OF A DEVICE

RELATED APPLICATIONS

This application is a continuation of U.S. application Ser. No. 12/842,899, filed Jul. 23, 2010, which is incorporated herein by reference in its entirety.

FIELD OF THE INVENTION

This invention relates generally to accessing a device, and, more particularly, to a method, apparatus, and system for controlling access of a device based upon an input received by the device.

DESCRIPTION OF THE RELATED ART

In light of the rise in the use of smart devices, the issue of controlling access to the content and operation of these devices has become more important. This is particularly the case for portable devices, such as wireless devices. The use of wireless devices continues to increase in modern society. People of various socioeconomic statuses use wireless devices in increasing numbers. Wireless devices may include various types of fixed, mobile and/or portable two-way communication devices, such as radios, cellular telephones, personal digital assistants, and/or various wireless networking devices. Protecting content and operation of these devices becomes more and more important as wireless devices increasingly become fixtures in our daily lives. Misappropriation of data, or the wireless devices themselves, may thus become more prevalent, and therefore users have the desire to restrict security and access to wireless devices accordingly. Issues such as identity theft and the use of personal wireless devices for work-related activities are also a factor in the need for more wireless device security.

As the complexities of smart devices increase, the amount of information processed and/or stored by smart devices, such as wireless devices or portable computing devices also increase. This may cause various security concerns. For example, wireless devices generally carry various types of personal information, such as financial records, medical records, contact information, network access information, etc. Users also utilize their wireless devices for increasing numbers of daily activities such as electronic mail, text messaging, paying bills online, managing personal and professional calendars, maintaining contacts information and the like. If this information were to be accessed by an unauthorized user, the security and privacy of the user, and possibly the security of other individuals or companies, may be compromised. Some solutions to this problem attempt to provide some security for the user by requiring a password input. However, many times, these passwords can be overridden, compromised, or not implemented by the user. Therefore, it would be desirable to efficiently prevent unauthorized usage of the wireless device by efficiently detecting and reacting to such unauthorized accesses, while maintaining convenient access to authorized users.

Further, designers have attempted to provide certain restrictions on the operation or usage of wireless devices in certain contexts. However, the current state of the art fails to perform such a function in an efficient and/or non-intrusive manner. Sonic state of the art systems suggest selection of applications without logging in to the device by moving icons to a particular location of the screen. However, the state of the art generally requires active selection of an application by the user in addition to performing an action to unlock a selected application. These systems require much intervention from the user in order to obtain access to an application on the device.

Modern hand held devices, such as cellular telephones and portable computing devices, provide a wide range of applications that may be used to perform various functions. Many hand held devices contain various applications, such as voicemail, email functions, text functions, games, productivity applications, etc. As handheld devices become more and more complex, adding additional applications and functions, efficient access to one or more functions of the handheld device can become more problematic.

A user may wish to lock the access to a handheld device and allow for access to the handheld device by performing security functions to unlock the handheld device. For example, many users require a log-in procedure in order to allow access to a handheld device. Due to the varied complexity of various applications or operations, not all applications on a handheld device need be locked or secured in an equal manner. However, state of the art handheld devices generally provide for blocking any access to the handheld device, thereby precluding relatively easy access to certain applications that may not require increased security features. Further, state of the art handheld devices generally employ standard log-in or access procedures which then must be followed by additional scrolling or searching for a desired application. This process may make access to a handheld device unnecessarily cumbersome. The state of the art lacks an efficient process for accessing one or more applications or operating modes available on a handheld device. Many systems generally lack an intelligent system within a wireless device that is capable of assessing certain applications or operations under certain conditions.

SUMMARY OF THE INVENTION

In one aspect of the present invention, a method for accessing at least a portion of a device based upon an access input is provided. An access input is received. The access input includes information for gaining access to one or more functions of the device. A user access mode of the device is changed from a first access mode to a second access mode based upon at least in part on the access input. An application is selected in the device in response to changing from the first access mode to the second access mode. At least a portion of the output of the selected application is provided.

In yet another aspect of the present invention, a computer readable program storage device encoded with instructions is provided for accessing at least a portion of a device based upon an access input, is provided. The computer readable program storage device encoded with instructions that, when executed by a computer, performs a method, which comprises: receiving an access input, the access input comprising information for gaining access to one or more operations of the device; determining whether at least one characteristic of the access input matches a characteristic of stored access data; and changing a user access mode of the device from a first access mode to a second access mode, based at least in part on the access input.

In another aspect of the present invention, a computer readable program storage device encoded with instructions is provided for accessing at least a portion of a device based upon an access input, is provided. The computer readable program storage device encoded with instructions that, when executed by a computer, performs another method, which comprises: receiving, from a user, an input gesture for gaining access to one or more operations of the device; comparing a characteristic of the received input gesture to a predetermined characteristic; determining whether the characteristic of the input gesture matches the predetermined characteristic; changing a user access mode of the device from a first access mode to a second access mode, based upon the input gesture; selecting an application in the device in response to changing from the first access mode to the second access mode; and providing access to the user to at least a portion of the operation of the selected application.

In yet another aspect of the present invention, a device capable of providing access based upon an input, is provided. The device includes: an interface for receiving an access input; and a processor operatively coupled to the interface device. The processor is adapted to receive an access input. The access input includes information for gaining access to one or more operations of the device. The processor is also adapted to determine whether at least one characteristic of the access input matches a characteristic of stored access data, and change a user access mode of the device from a first access mode to a second access mode, based at least in part on the access input.

BRIEF DESCRIPTION OF THE DRAWINGS

The invention may be understood by reference to the following description taken in conjunction with the accompanying drawings, in which like reference numerals identify like elements, and in which.

Figure 1:
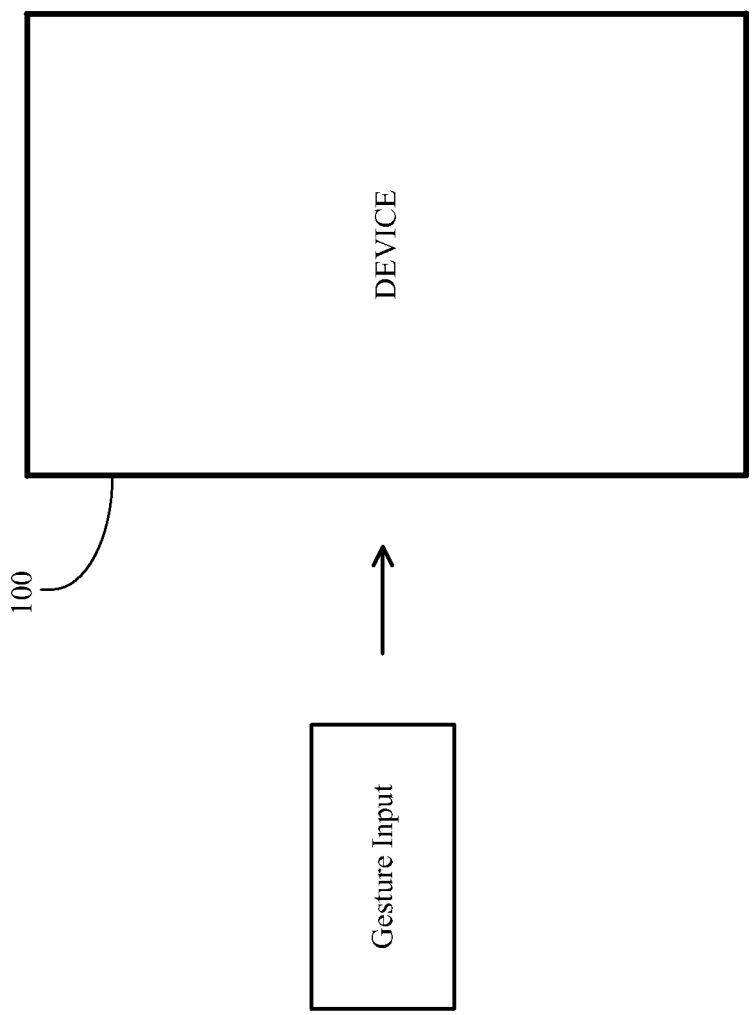
FIG. 1 illustrates a stylized depiction of a device for providing at least one access mode, in accordance with on illustrative embodiment.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

One or more embodiments disclosed herein provide for one or more access input modes of a smart device, such as a cellular phone or a Smartphone (e.g., the iPhone™ from Apple Inc.), a desktop computer (e.g., the Mac Pro™ from Apple Inc.), a portable computer (e.g., the Macbook Air™ from Apple Inc.), a touchpad or tablet computer (e.g., the iPad™ from Apple Inc.), a portable music device (e.g., the iTouch™ from Apple Inc.) a personal digital assistant (PDA), etc. The term "smart device" may encompass a variety of types of devices that comprise a controller, a processor, a micro-controller, a micro-processor, programmable device (e.g., a field programmable device, an ASIC, etc.), and/or the like. Embodiments disclosed herein provide for access to a smart device in a relatively non-cumbersome or efficient manner.

The terms "adapted to" and "capable of as used herein may imply, among other things, that a device has a structure sufficient to perform some task or operation. The terms-adapted to" and "capable of" are not used to state (implicitly or explicitly) mere intended use limitations in the description and claims of the instant application.

In one embodiment, a predetermined gesture performed by a user of a handheld device may be utilized to provide for a particular type of access to one or more operations of the handheld device. For example, a handheld device may be programmed to detect a particular gesture from a user and change an access mode with a handheld device. This change in access mode, for example, may include changing from a secure, inaccessible mode to a second access mode that may provide for accessing one or more features or applications of the handheld device, while maintaining inaccessibility to other features. For example, if an access input, e.g., a gesture pressed upon a touch screen or other surface, is received from a user, a handheld device may continue denying access to email functions but may provide access to gaming functions of the handheld device. A second predetermined gesture may be employed such that upon detecting the second gesture, an application, e.g., an email application, may be brought up without further input from the user. In this manner, based upon one or more access inputs detected by a handheld device, the access mode or state of the device may be altered (e.g., altering the access mode from a secure access mode to a non-secure (or less secure) access mode, to another access mode that allows for certain applications such as phone calls while denying access to other applications, such as email functions, etc.).

As described below, a number of types of gestures may be detected by the handheld device, including but not limited to, a predetermined pattern detected by a touch-sensitive screen (e.g., a circular pattern ending with a straight line, circular pattern with a line that crosses the circle, a square followed by a triangle, etc). In one embodiment, the handheld device of at least one embodiment of the present application may be programmed to allow for predetermined programming of an access input, e.g., a gesture. For example, a circular-pattern gesture followed by a particular letter drawn on a touch screen within a predetermined period of time may be detected by a smart device, and immediate access to emails may be provided as a result. In this manner, a user can perform multiple functions using gestures, such as unlocking a handheld device, changing the operating mode of the device, and/or executing an application or a function of the handheld device. In addition to touch screen gestures, other access inputs (e.g., a keyboard/keypad input, a mouse input, a stylus or light pen input, an audio input, an optical input, other sensor input, etc.) may be used to perform similar changes of an access mode of a smart device. In this manner, a user may develop a secret access input that may only be known to the user in order to gain access to a handheld device.

Embodiments of the present invention may be employed to provide for user-authentication to unlock a device and/or to initiate or launch a particular application. Embodiments of the present application may also provide for pre-selecting or preprogramming a plurality of access inputs, e.g., gestures that may be detected and recognized by a smart device. For example, a first gesture may provide for changing the operation mode from a secure mode to limited-access mode of a handheld device such that only games on the handheld device may be accessed. Likewise, a second gesture being detected by the handheld device may prompt it to perform a second function, such as launching a particular application like an email application. Those skilled in the art having the benefit of the present disclosure would appreciate that additional gestures may be pre-programmed into the handheld device such that, upon detection of such a gesture, various corresponding operation(s) and/or application(s) may be launched by the handheld device. Although some principles described herein are discussed in the context of a handheld device, these principles would also apply to other electronic devices, handheld or not, such as personal digital assistant (PDA), game consoles, computers, entertainment devices, graphical user interfaces, automobiles, etc.

Utilizing the access inputs described herein, a user may efficiently access one or more applications described herein without the tediousness of a fully-fledged log-in process. For example, a touch gesture that follows a predetermined pattern may lead to direct access of a predetermined application associated with the particular detected gesture. In other embodiments, upon detecting a non-use time out, the device may enter one access mode, e.g., full security mode that prevents any access to any application in the device. Subsequently, upon detection of a predetermined access input, the device may enter a second access mode wherein a preselected one or more applications may be instantly accessed without logging into the locked device.

In some embodiments, particular gestures can be associated with various operating access modes wherein a category of applications may be made readily available for access, while other categories of applications may be restricted until a full log-in is detected by the device. For example, based upon a first detected gesture, access to a set of entertainment applications (e.g., games, music applications, etc.) may be provided. Likewise, based upon a second gesture, access to communication applications, (e.g., email application, SMS application, etc.) may be provided. In this manner, access to particular applications may be restricted due to the security restrictions provided by the device, wherein the security may be overcome based upon the predetermined pattern of gestures or other access inputs, without the burdens of a complete log-in to the device. In this manner, different accesses to different applications (or categories of applications) may be provided to different users. For example, a parent may provide access to a minor child for only the entertainment category of applications, e.g., gaming applications, music applications. etc. Moreover, further restrictions can be maintained with regard to other applications types, such as productivity applications, e.g., word processing applications and the like.

Turning now to FIG. 1, a stylized depiction of a device 100 receiving an access input, in accordance with one embodiment, is illustrated. The device 100 may be one of a variety of types of devices that may comprise a processor, a microcontroller, a programmable gate array device, microprocessor, an ASIC, and/or the like. An access input, e.g., a gesture, may be provided to the device 100, wherein the device is capable of providing access to one or more applications based at least upon the particular type access input.

Figure 2:
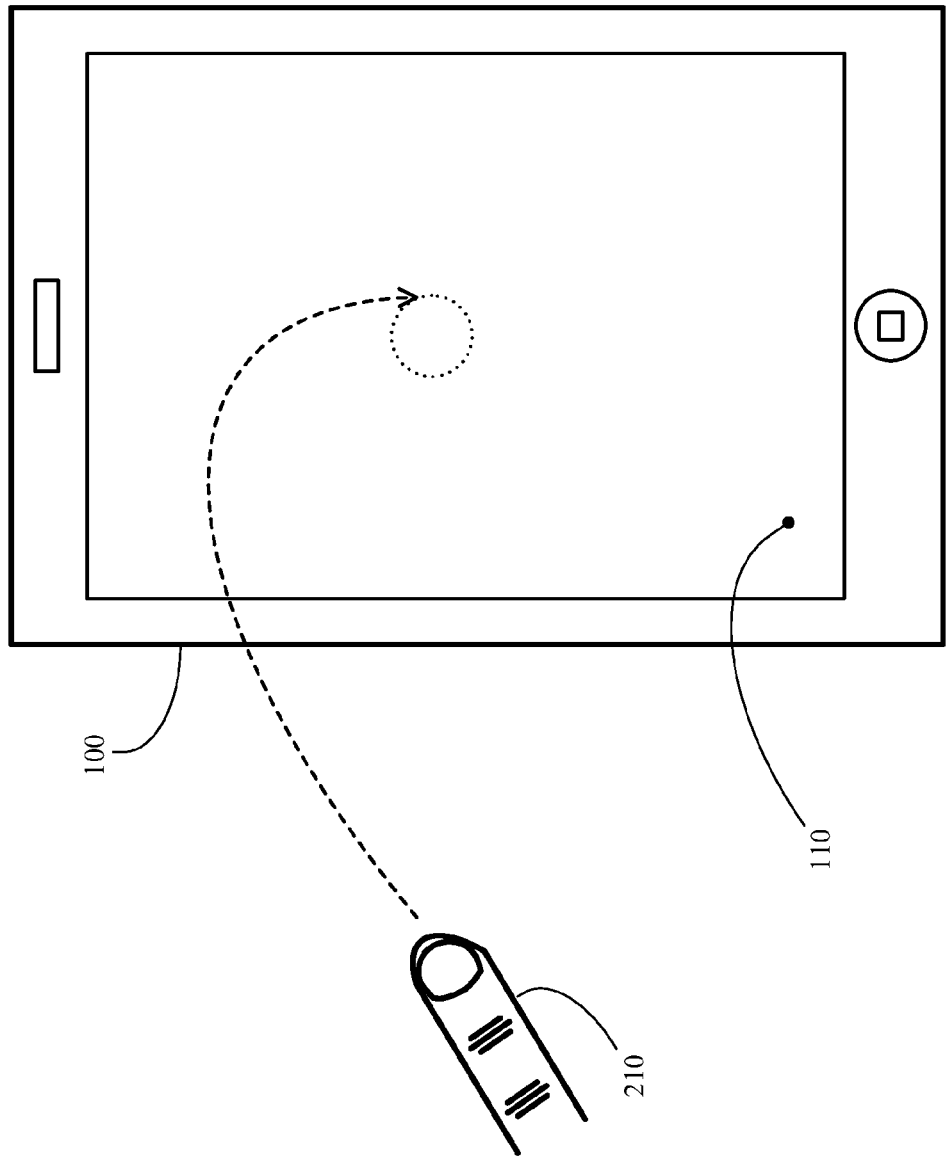
FIG. 2 illustrates a styled depiction of the device of FIG. 1 receiving an access input, in accordance with one illustrative embodiment.

Turning now to FIG. 2, an example of a touch screen access input may be received by the device 100 is illustrated, in accordance with one embodiment. For example, the finger 210 of a user may perform a circular type of gesture on the touch screen 110 or with a mouse pad of the device 100. The particular circular pattern may be pre-programmed into the device 100 wherein the input would be interpreted as a message from an authorized user requesting access to a particular application or a group of applications. Based upon the gesture received by the device 100, one or more functions, such as an unlocking or partial unlocking of the device 100 and/or an access or launch of an application or a group of applications may be performed. In this manner, a user can quickly, without cumbersome log-in processes, access a pre-determined application in an efficient manner.

Figure 3:
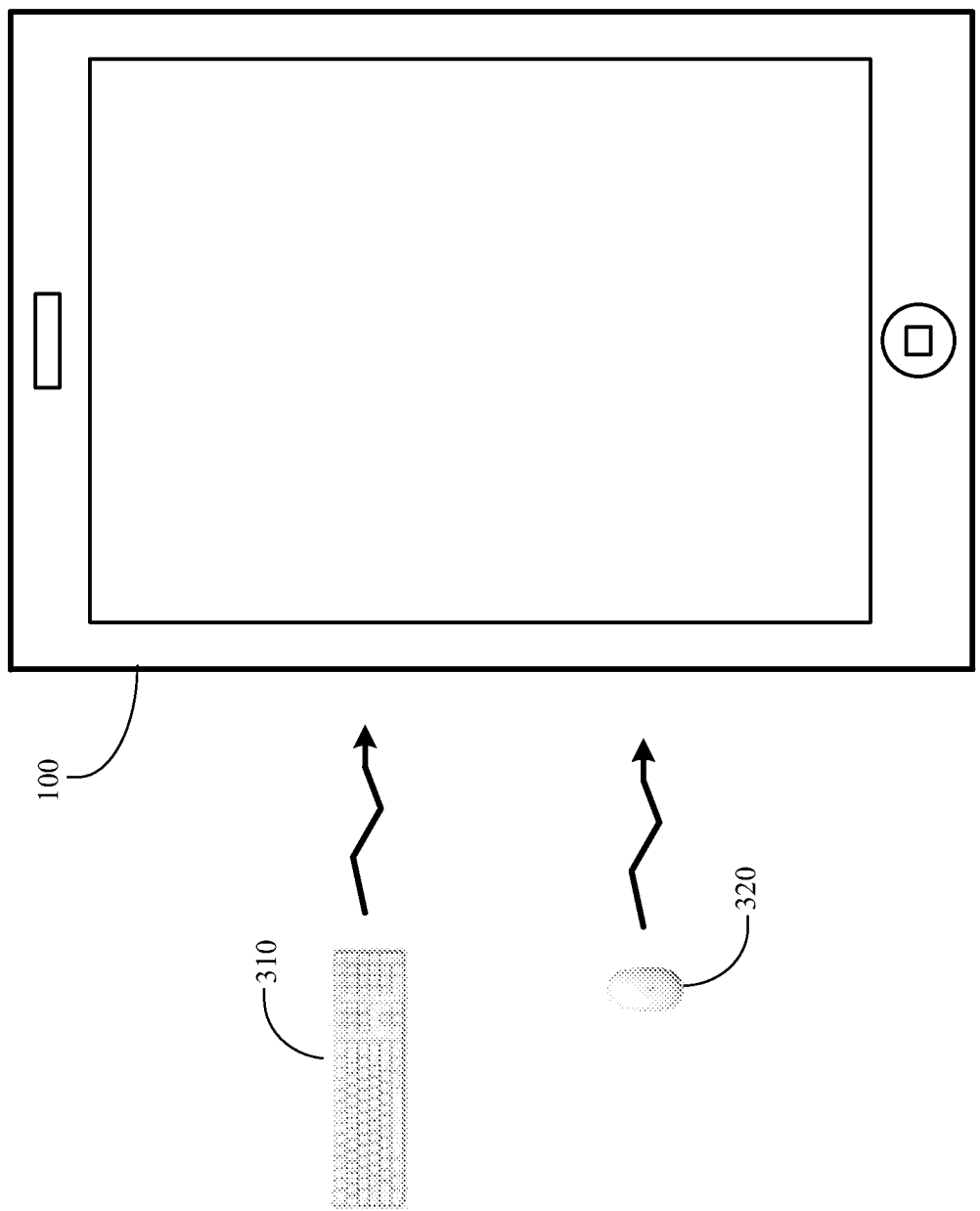
FIG. 3 illustrates a stylized depiction of the device of FIG. 1 receiving an access input from a keyboard or a mouse, in accordance with one illustrative embodiment.

As another example of an implementation of an embodiment provided herein, FIG. 3 illustrates a stylized depiction of a device 100 receiving a gesture or an access input from a keyboard 310 or a mouse 320, in accordance with one embodiment. Based upon the input received from the keyboard 310, or the mouse 320, the device 100 may provide unlocking functions and/or access or initiation of an application. For example, a particular predetermined keystroke, such as a "*-3-2-1" being entered into the keyboard may signal to the device 100 that access to text message applications of the device should be opened while the device is unlocked. This code may be pre-programmed by the user into the device 100, or by the manufacturer during manufacturing, assembling or shipping of the device 100.

Similarly, the mouse 320 may provide a particular click followed by a predetermined motion, such as a circular motion to provide an access input or gesture to the device 100. Based upon the type of click and/or gesture detected from the mouse 320, the device 100 may provide for unlocking the device 100, partially unlocking the device 100 and/or accessing or launching of an application residing in the device 100.

Figure 4:
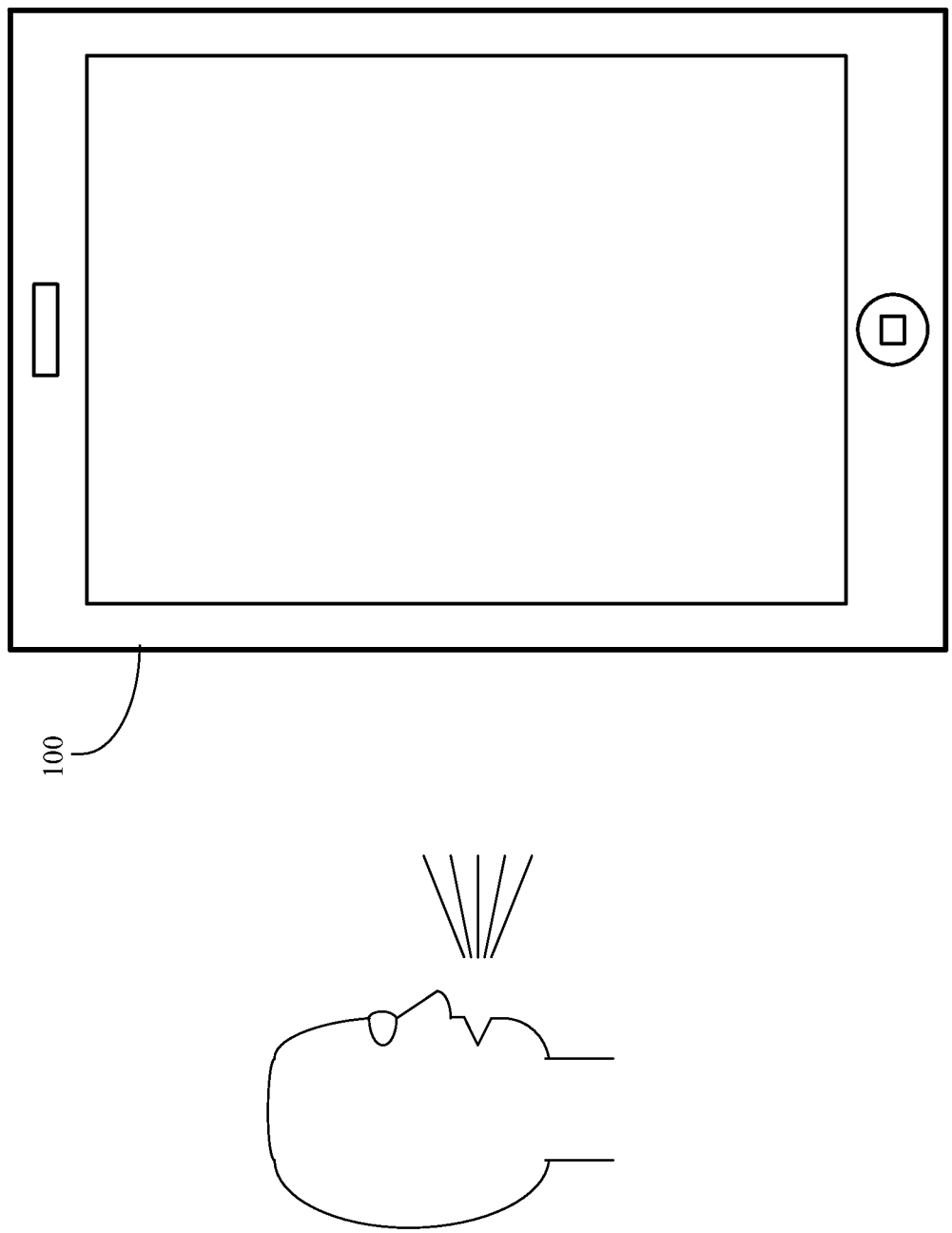
FIG. 4 illustrates a stylized depiction of a device of FIG. 1 receiving an audio access input, in accordance with one illustrative embodiment.

Turning now to FIG. 4, a stylized depiction of the device 100 receiving an audio gesture, in accordance with one embodiment is illustrated. A predetermined voice or sound may be recorded into the device 100. This voice recordation or sound may be used by the device 100, when receiving a matching auditory signal, to provide access to one or more applications in the device 100. The access input or the audio gesture received by the device 100 may be a certain sound, tone, sequence of letters, words or numbers, codes, etc. Further, speech recognition capabilities may be used by the device 100 to perform speech recognition and provide appropriate access and unlocking of the device 100 and/or provide access to one or more applications.

In this manner, various types of gestures or access input signals may be provided to a device 100 to gain access to the device 100. The access may include an unlocking feature, a display of one or more selectable applications, initiation of an application, etc. Further, in one embodiment, the device 100 may display one or more application-representation graphics, e.g., an icon, that may be selectable by the user based upon an access input. In one embodiment, the user may touch one icon while performing a second gesture, e.g., a touch gesture, such as a particular pattern on the touch screen, or enter a voice gesture, such that immediate access to the selected application may be provided. These access functions may be performed without requiring a full log-in to the device. In this manner, secondary restricted users may only be allowed certain applications, while the primary user(s) of the device will have further enhanced access, or complete access, to any application based upon the specific access input detected by the device 100.

Figure 5:
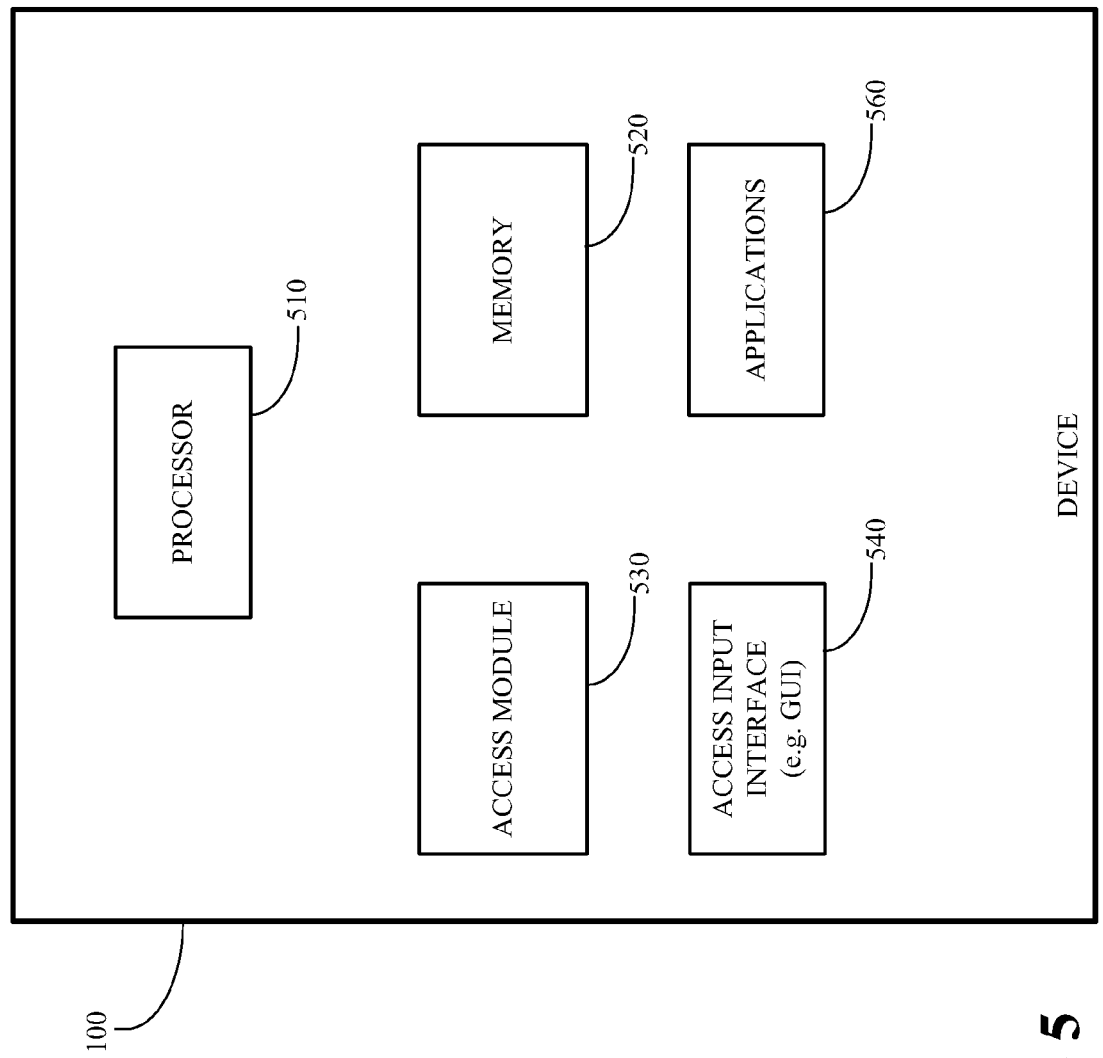
FIG. 5 illustrates a stylized block diagram depiction of one embodiment of the device of FIG. 1, in accordance with one illustrative embodiment.

Turning now to FIG. 5, a background depiction of the device 100, in accordance with one embodiment, is illustrated. In one embodiment, the device 100 may comprise a processor 510, a memory 520, an access module 530 and access input interface 540, and one or more application(s) 560.

The processor 510 of the device 100 is capable of performing (and/or adapted to perform) various processing-type functions that may affect the operation of the device 100. The processor 510 may represent a single processor, a plurality of processors (e.g., co-processors), digital signal processors (DSPs), microprocessors, and/or microcontrollers, memory components, etc., that work independently or in conjunction with each other. The memory components associated with the processor 510 may be a computer readable program storage device that may be encoded with instructions that, when executed by a computer or the processor 510, performs various methods associated with the embodiments described herein. The collective term processor 510. thus, may represent various types of processors, a computing device, a programmable device, and/or controllers. Further, a programmable device, such as a field programmable gate array (FPGA) device, an application specific integrated circuit (ASIC), complex programmable logic device (CPLD), programmable logic array (PLA) and/or programmable array logic (PAL) may be implemented to perform various control functions that may be represented by the processor 510. In one embodiment, the processor 510 may be a computer as known to those skilled in the art having benefit of the present disclosure. In one embodiment, this computer may be a device that is capable of interfacing with a computer readable program storage device that may be encoded with instructions that, when executed by the computer, performs various methods associated with the embodiments described herein.

The memory 520 of the device 100 may comprise various types of memory, such as DRAMS, SRAMS, other types of volatile and/or non-volatile memory, read-only memory, random access memory, solid state storage devices, hard disk drives, etc.; the various types of memory may be embedded memory, stand-alone memory and/or the like, in accordance with various embodiments. Various types of memory capacities may be implemented by those skilled in the art, having benefit of the present disclosure, and remain within the spirit and scope of the embodiments disclosed herein. The memory 520 is capable of storing various data, such as control parameters, information relating to state look-up data, etc. The memory 520 may be a computer readable program storage device that may be encoded with instructions that, when executed by a computer or the processor 510, performs various methods associated with the embodiments described herein. In one embodiment, the memory 520 may also include a database.

The access module 530 is capable of controlling access to the device 100. The access module 530 may restrict any/all access to the device 100, or provide partial access to one or more applications of the device 100 based upon one or more access inputs received by the device 100. The access module 530, based upon an access input, such as a gesture received by the device 100, may provide access to the device 100 and/or initiate or start-up an application(s) 560 residing on the device 100. This process may be based upon certain predetermined inputs expected by the device 100, which may be correlated to one or more applications or group of applications 560. In this manner, the access module 530 can perform a security function as well as a utility function, wherein the security function provides for restricting access to particular users, and the utility function provides for executing one or more applications 560. The access module 530 is capable of restricting and providing specific access to individual applications and/or group applications. The access module 530 is also capable of correlating a particular access input, e.g., a gesture, with specific application(s). Further details with respect to the access module 530 are provided in FIG. 6 and the accompanying description below.

The access input interface 540 is capable of receiving one or more access inputs from a user. Further, the access input interface 540 is capable of processing an access input signal and performing various functions such as analog-to-digital (AID) conversion, filtering, digital signal processing, correlation(s), lookup functions (e.g., matching an access input signal to a stored signal), etc. The access input interface 540 is also capable of performing various functions relating to a graphical user interface. In other words, the access input interface 540 is capable of providing information to a user via a graphical interface and receiving information from an external source, such as a user. The access input signal received and processed by the access input interface 540 may comprise various types of signals, such as touch input signals from a touch-sensitive screen, audio signals, keyboard-generated signals, mouse-generated signals, infrared signals and/or the like. The access input interface 540 is operationally coupled to the access module 530 and is capable of sending and receiving signals to and from the access module 530.

The access input interface 540 may comprise various registers, operational amplifiers (op amps), buffers, inverters, combinatorial logic, transistors, FIFOs, etc. The device 100 may also comprise one or more applications 560 that may be native to the device 100 and/or inserted into (or installed on) the device 100. For example, in a communication handheld device, such as a cellular telephone, various applications, e.g., communication application for making telephone calls, SMS messaging, emails, etc., may be provided. Further, other applications, such as gaming functions, games, music download applications, such as the iTunes™ offered by Apple Inc., and/or various other types of applications may also be provided.

In one embodiment, the application(s) 560 may be compartmentalized or grouped in various types of applications, such as communication applications, entertainment applications, work productivity applications, etc. For example, the communication applications may comprise various types of communication applications, such as email applications, text messaging applications, telephone applications, chat application, social networking applications, and/or the like. The entertainment applications may include various types of applications, such as music applications, games, video/movie applications, etc. The work productivity applications may include various types of applications, such as word processing applications, database applications, spreadsheet applications, presentation applications, and/or the like. Additionally, web applications and web browsers, such as Safari, by Apple, may be an application group.

One or more of the modules/units indicated as being part of the device 100 may be a software module, a firmware module and/or a hardware module. In one embodiment, these modules/units may be implemented by a variety of software language, hardware circuitry, and/or hardware defined by hardware descriptive language (HDL) or equivalent. Those skilled in the art, having benefit of the present disclosure, may implement these modules/units in various software, hardware, and/or firmware forms and remain within the scope of the embodiments disclosed herein.

Figure 6:
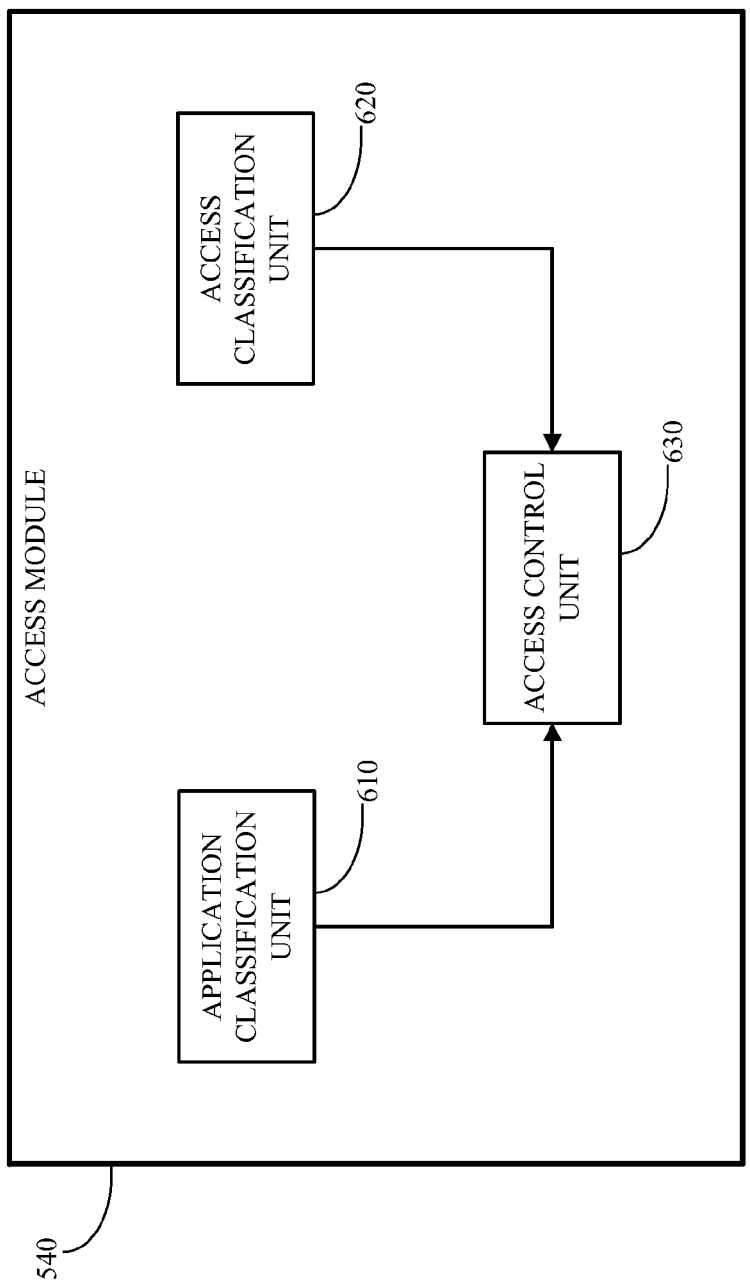
FIG. 6 illustrates a stylized block diagram depiction of an access module of FIG. 5, in accordance with one illustrative embodiment.

Turning now to FIG. 6, a block diagram depiction of the access module 530 (FIG. 5), in accordance with one embodiment is illustrated. In one embodiment, the access module may comprise an application classification unit 610, an access classification unit 620, and an access control unit 630. The application classification unit 610 is capable of performing various classification functions with respect to various application(s) 560 residing on the device 100. For example, the application classification unit 610 is capable of dividing various communication-type applications into a communication application group. Other groupings or classifications performed by the unit 610 may include grouping together various productivity type applications, such as word processing applications and database applications.

The application classification unit 610 may be utilized at manufacture or at point of sale to classify various applications residing on the device 100. Further, the application classification unit 610 is capable of allowing a user to set up groupings of various applications at any time. This provides for a dynamic and/or a static type of grouping. In one embodiment, a static grouping may refer to grouping applications at manufacture or allowing a user to pre-group various applications and then use the groupings henceforth. In one embodiment, dynamic grouping may refer to a process wherein the user may change groupings frequently, e.g., before logging out of the device and/or locking the device, i.e., allowing grouping from one use of the device to another use of the device.

The application classification unit 610 may work in conjunction with the access classification unit 620. The access classification unit 620 is capable of setting up various types of accesses to the device 100 based upon inputs received by the device 100. For example, a first gesture, such as a touch-screen input made in a circular fashion may be classified as a first type of access, e.g., an entertainment application access. The classification of applications into an entertainment application group, for example, may be performed at manufacture or at point of sale in a static fashion, or by the user. Alternatively, this classification may be performed dynamically by the user at any time. Therefore, various classifications of accesses may be set by the user and correlated to particular classifications of applications 560. These classifications may be made via the access control unit 630, which provides for interaction with a user to perform the classifications described above.

Based upon various inputs received by the user, the access control unit 620 may correlate particular classifications of access inputs to particular classifications of applications. Therefore, a user can set up one type of access input to provide for access to communication applications, another type of access input to provide for access to work productivity application, and a third type of gesture to provide for access to entertainment applications. Those skilled in the art, having benefit of the present disclosure, would appreciate that various other types of classifications of applications and accesses may be performed while remaining within the spirit and scope of the embodiments provided herein. In this manner, one device may be utilized by multiple users, wherein various distinct restrictions may respectively apply to different users. For example, the productivity applications may only be available to a person with knowledge of a specific access input or gesture that would be required to access those relevant productivity applications, i.e., the owner of the device. In contrast, a minor child may be provided with a second access input or gesture for access, wherein the usage of the device 100 in this case may be restricted to only entertainment applications.

Figure 7:
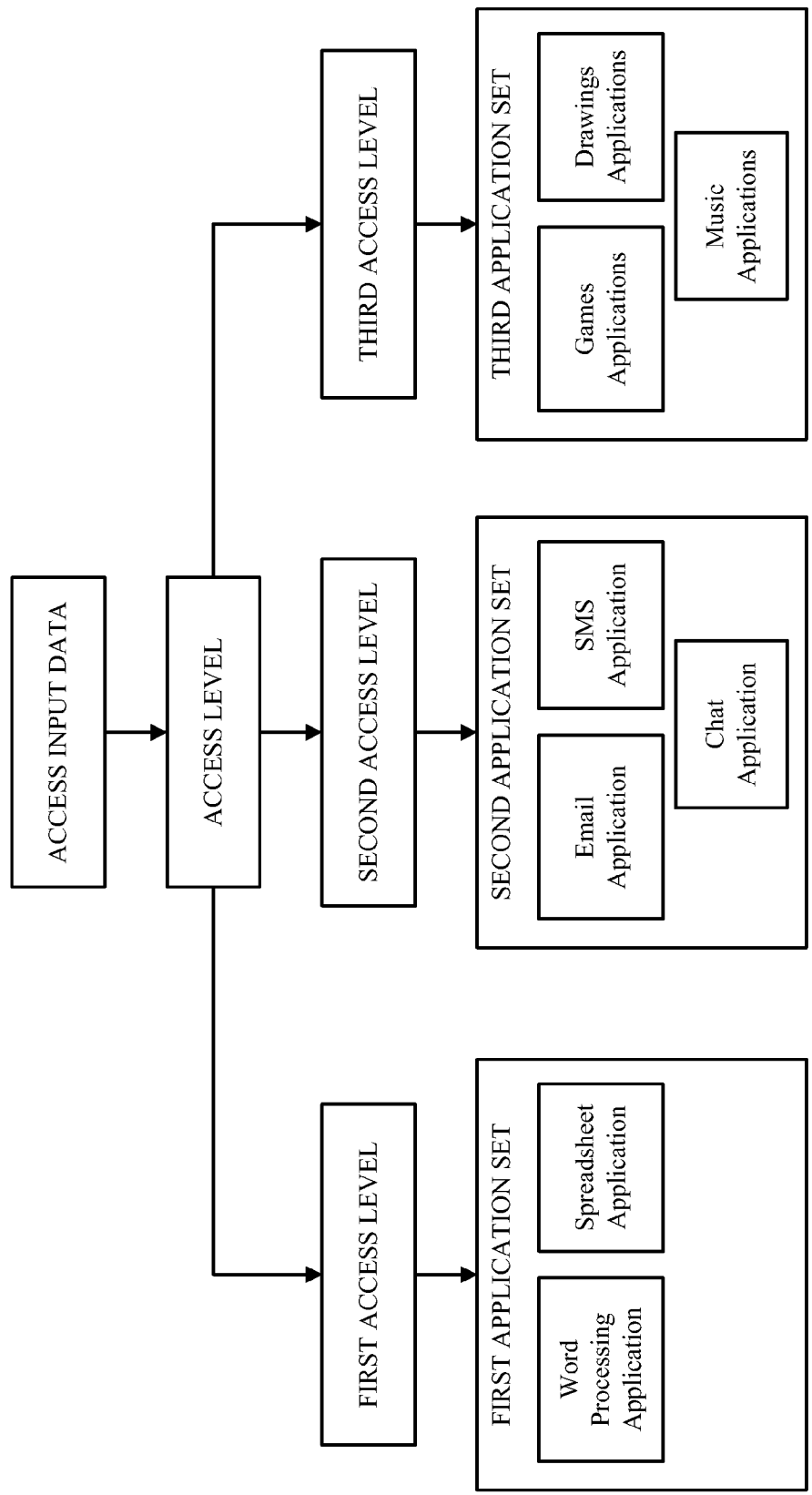
FIG. 7 illustrates a block diagram depiction of the flow of access input data employed by the device of FIG. 1, in accordance with one illustrative embodiment.

Turning now to FIG. 7, a block diagram depiction of steps relating to accessing the device 100, in accordance with one embodiment is illustrated. The device 100 may receive access input data from a user. The access input data may include touch-screen gestures, voice gestures, audio input signals, keyboard/keypad or mouse inputs, etc. Based upon the access input data, the device 100 is capable of determining an access level. In one embodiment, the access level may refer to various security levels which may be set up in the device 100 to allow access to specific application(s) or application groups residing in the device 100. For example, a first access level, a second access level and a third access level may be generated to specify which type of access and/or function are provided by the device 100 upon receiving a particular access input data. That is, particular access input data may be associated with a particular access level, which in turn, may be associated or correlated to a particular application or application group.

The access levels described above may be programmed or configured by a user, for example, utilizing the access module 530 described above. Based upon the particular access level received by the device 100 (in the form an access input signal), certain functions may be provided by the device 100. For example, upon receiving a particular access level, access to a particular application or application group may be provided to the user. Moreover, the particular application may be launched without further input from the user.

In one embodiment, a user may preset various applications, such as a first application set which may include productivity applications (e.g., word processing and spreadsheet applications), a second application set which may include communication applications (e.g., email applications, SMS applications, chat applications, etc.), and/or a third application set which may comprise entertainment type applications (e.g., game applications, drawing applications, music applications, etc.). The first, second and third application sets may be respectively correlated to the first, second and third access levels, which in turn are respectively correlated to first, second, and third access input signals. Therefore, based upon the access input data received, the device 100 may determine a particular one of the first, second or third access levels. Depending on which access level is initiated, a particular application set may be selected for access and/or execution. Accordingly, if the access input data calls for a first access level, the first application set may be unlocked such that it is accessible to the user. In one embodiment, this accessibility may include providing a preview of any documents that are available to be opened, wherein this feature may be selectable by the user.

Similarly, if the access input data calls for a second access level, the second application set may be unlocked and/or executed. This may include a preview of the number of new emails available to be viewed, new SMS messages to be read, and/or new chat messages that may have been received. In one embodiment, without further intervention, one or more applications from the second application set may be launched based upon receiving access input data that relates to the second access level. In an alternative embodiment, upon receiving access input data that relates to the second access level, the user may be provided an option or a preview in a selectable fashion such that the user may select one or more of the applications or messages that may be read. Upon reading such messages, another option to reply to the message may be provided to the user.

Similarly, launching of the third application set may be performed in response to receiving access input data that relates to the third access level. Several applications, such as games or music applications, may be previewed to the user, e.g., types of games available for playing, types of music, and/or the name of songs that may be available for playing. Those skilled in the art having the benefit of the present disclosure would appreciate that various other types of applications sets may be generated along with additional access levels corresponding thereto. Further, in alternative embodiments, a particular access level may prompt the device 100 to provide access to the plurality of application sets based upon a single access level detected by the device 100.

Figure 8:
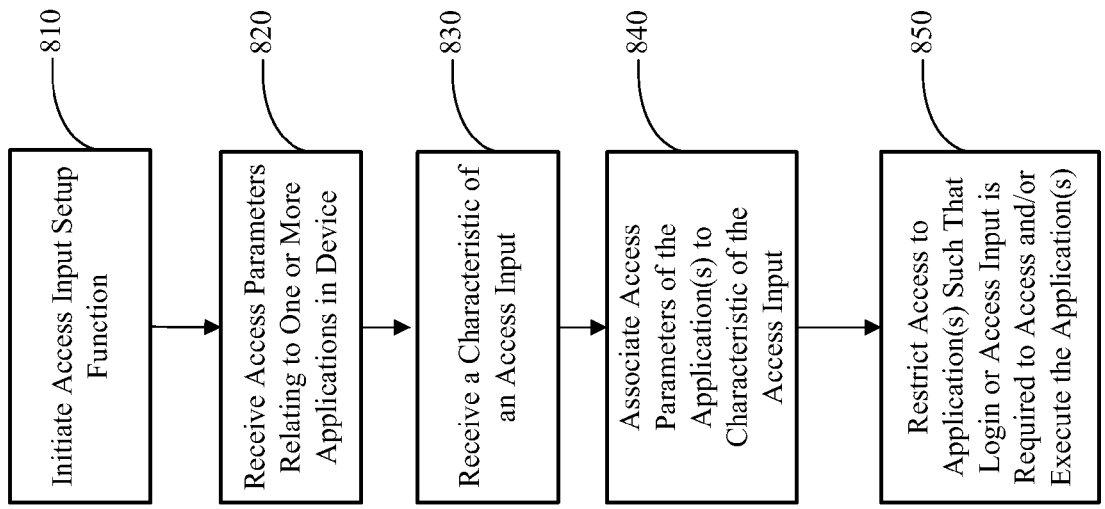
FIG. 8 provides a flowchart depiction of performing set-up function for of an access input of the device of FIG. 1, in accordance with one embodiment.

Turning now to FIG. 8, a flowchart depiction of the steps for setting up an access restriction function for the device 100, in accordance with one embodiment, is illustrated. The setting up of particular access features for the device 100 may be performed during manufacture, in a static mode where an operator sets the access features for normal operation, and/or a dynamic adjustment of various access definitions and application groupings. The device 100 may allow for the initiation of an access input setup function (block 810). Once the access input setup function of the device 100 is initiated, the device 100 may be readied to receive access parameters relating to one or more applications in the device 100 (block 820). These parameters may include selections as to how to group various applications into different application groups. The groups may contain one or more applications.

In one embodiment, the applications may be divided into various subgroups, such as entertainment application groups, productivity application groups, communication application groups, etc. In one embodiment, the device 100 provides for the ability for a user to tag and create various patterns or gestures that may be inputted into the device via the text screen or a mouse operation or the like. Further, the user may define keyboard/keypad entries, sound, audio entries, or the like. Based upon the access input setups, the user may also tag various applications to correspond to the particular access input signals.

The device 100 may also receive a characteristic of an access input (block 830). These characteristics may correlate to the various access input patterns or to data that may have been created previously in a static manner, or created dynamically. Based upon the characteristics of the access input received, as well as the parameters relating to the applications, the device 100 may associate access parameters of the application to a particular characteristic of the access input (block 840). This may be performed under the direction of the user or in a predetermined manner. Therefore, a first access parameter relating to an application may be used to categorize the application in the first group, and a first access input characteristic may then be correlated to the first application group.

Based upon the associations of the applications and access input characteristics described above, the device 100 may restrict access to the selected applications such that formally/completely logging in to the device 100, or more specific access input data, would be required to access and/or to execute the particular applications in the particular group (block 850). In other words, based upon the parameters used to categorize the application and/or the particular application group, as well as the received access input characteristics, a desired restriction for accessing and executing those applications may be set up by the user. The user, for example, may decide that based upon a particular access input gesture, applications within a communication group of applications may be unlocked. Alternatively, in this circumstance, one or more applications in this communication application group may be partially executed to indicate a particular number of emails that are new, but still remain restricted such that the actual message cannot be read without further log-in requirements. Those skilled in the art having benefit of the present disclosure may be able to implement a variety of types of restrictions and accessibility. In this manner, the user may set up restrictions and/or execution functions for any number of applications (or combinations of applications) or functions of the device 100.

Figure 9:
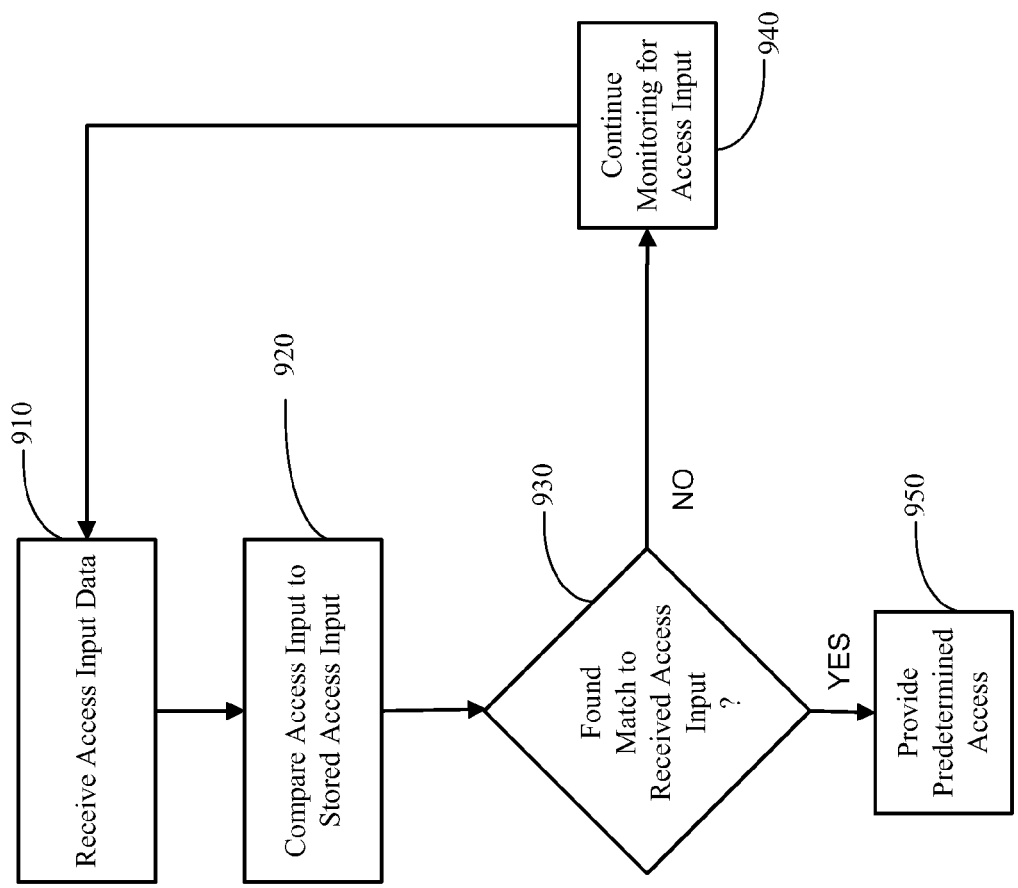
FIG. 9 illustrates a flowchart depiction of a method of performing an access input of the device of FIG. 1, in accordance with one embodiment.

Turning now to FIG. 9, a flowchart depiction of the method for accessing one or more applications of the device 100, in accordance with one illustrated embodiment, is provided. Generally, a device 100 may be locked by default, time out, or by active action by a user. Therefore, upon accessing the device 100, a user may provide an access input data, which may be received by the device 100 (block 910). The access input data may be one of several types of data described herein, such as audio data, keyboard/keypad entry data, mouse data, a touch-screen touch pattern, etc. The device 100 may then compare the access input data to one or more stored access input data (block 920). This may be performed by comparing the received data with data stored in a look up table, wherein the comparison data may be stored in the memory 520 (FIG. 5).

The device 100 may then determine whether a successful match has been found based upon the comparison (block 930). The comparison may be made using a variety of methods, such as mathematical comparison, digital comparison, bit/byte/word comparison, match filter comparison, etc. If a determination is made that no match has been found to the access input data, access is denied, and the device may remain locked and/or inaccessible. The device 100 may continue monitoring for access input (block 840). If a match between the access input data and an access input stored data has been found, the corresponding predetermined access to the device 100 may be provided (block 950). A more detailed description of the step of providing a predetermined access of block 950 is provided in FIG. 10 and the accompanying description below.

Figure 10:
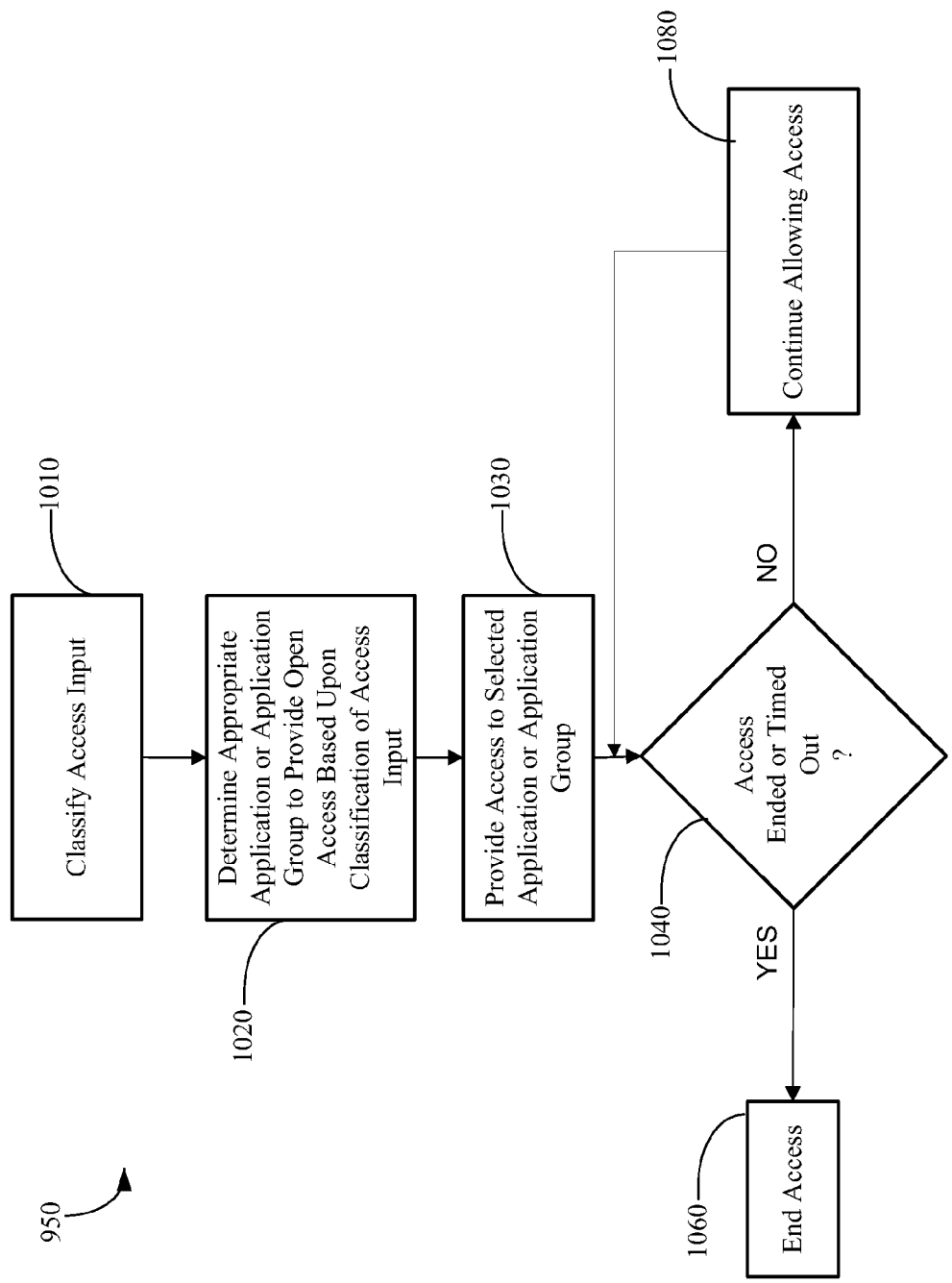
FIG. 10 illustrates a flowchart depiction of the step of providing access to the device of FIG. 1, in accordance with one illustrative embodiment.

Turning now to FIG. 10, a flowchart depiction of the step of providing predetermined access (block 950), in accordance with one illustrative embodiment is provided. The device 100 may perform a classification of the access input (block 1010). After the device 100 determines that a match has been found with respect to the received access input data, it may be classified as an access level into various groups, such as a high security group, a medium security group, a low security group, an entertainment group, a productivity group, a message checking group, etc., and/or any combination thereof. Once the access input data is classified, the device 100 may determine an appropriate action in response (block 1020). That is, the device 100 may determine which appropriate application or application group to consider as accessible based upon the classification of the access input. For example, based upon a first input access data, the device 100 may select a previously correlated application or applications group for which to display or provide access to the user. In one embodiment, icons relating to the applications in an application group may be displayed to the user such that the user may further select which application to launch. Alternatively, one or more applications may be automatically launched based upon the access input data. In further alternative embodiments, the device 100 may be partially unlocked, and an application may be partially executed such that the application may display some information, such as the number of emails that remain unread or notification of any new SMS messages that were received.

In this manner, once an appropriate application is selected based upon the access input, the device 100 provides access and/or executes a portion, or all, of a selected application and/or an application group (block 1030). The device 100 may continue to monitor the accessing of the device 100 and make a determination whether the access has ended or timed out (block 1040). For example, limited access may be provided based upon a particular access input such that the access may time-out after a certain time, or the user may close the application, thereby ending a particular session.

If a determination is made that the access has neither ended nor timed out, the device 100 may continue to allow the particular access (block 1080). However, if the device 100 determines that the access has ended or has timed out, the access may then be terminated (block 1060). In this manner, security accessibility to the device 100 may be tailored to the needs of a particular user, and further, may be tailored to provide different access and different functions for different users. This access may be configurable by the user or may be set in a default mode where sensitive applications may be restricted, and/or may be statically or dynamically set up by a user. Therefore, utilizing embodiments provided herein, various portions of the device 100, or alternatively all portions, may be protected, and yet efficiently accessed by quick gestures and/or other access data input(s).

Utilizing embodiments of the present disclosure, various access modes may be implemented by the device 100 in response to the detection of one or more access inputs detected by the device 100. Although the embodiments disclosed herein have been described in the context of various types of wireless/mobile devices, those skilled in the art having benefit of the present disclosure would understand that the concepts provided herein may be utilized for other types of devices, such as other un-wired devices, stationary devices (such as desktop computers, mainframes, manufacturing tools, base stations of various types), as well as other user devices, and remain within the spirit and scope of the embodiments disclosed herein.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A non-transitory computer readable program storage device, encoded with instructions that, when executed by a portable electronic device with multiple user accounts, cause the portable electronic device to perform operations comprising:

receiving a first gesture from a user, the first gesture received through a touch screen interface of the portable electronic device while the device is in a locked mode;

determining that the received first gesture meets a predetermined condition for a gesture to provide access to a first user account;

in response to determining that the received first gesture meets the predetermined condition for a gesture to provide access to a first user account, unlocking the electronic device and entering a first user account mode to provide access to a first plurality of applications on the device that are enabled for access under the first user account, and displaying icons associated with the first plurality of applications on the touch screen;

receiving a second gesture, the second gesture received through the touch screen interface of the portable electronic device while the device is in the first user account mode;

determining that the received second gesture meets a predetermined condition for a gesture to provide access to a second user account; and in response to determining that the received second gesture meets the predetermined condition for a gesture to provide access to a second user account, changing the operational mode of the electronic device to provide access to a second plurality of applications on the device which are enabled for access under the second user account, and displaying icons associated with the second plurality of applications on the touch screen;

wherein the first plurality of applications includes one or more applications that are not within the second plurality of applications.

2. The computer readable program storage device of claim 1, wherein the operations include receiving one or more inputs through the touch screen before the receiving of the first and second gestures, the one or more inputs identifying at least one application to be included in the first plurality of applications, and at least one application to be included in the second plurality of applications.

3. The computer readable program storage device of claim 2, wherein the operations include receiving at least a plurality of inputs through the touch screen before the receiving of the first and second gestures, the plurality of inputs including:

a first input identifying the gesture to provide access to a first user account; and a second input identifying the gesture to provide access to the second user account.

4. The computer readable program storage device of claim 1, wherein the operations include, while in the first user account mode, enabling partial access to an application in the first plurality of applications, wherein at least one function of the application is accessible and at least one other function of the application is inaccessible.

5. A computer-implemented method, comprising: at a portable electronic device with multiple user accounts:
receiving a first gesture from a user, the first gesture received through a touch screen interface of the portable electronic device while the device is in a locked mode;
determining that the received first gesture meets a predetermined condition for a gesture to provide access to a first user account;
in response to determining that the received first gesture meets the predetermined condition for a gesture to provide access to a first user account, unlocking the electronic device and entering a first user account mode to provide access to a first plurality of applications on the device that are enabled for access under the first user account, and displaying icons associated with the first plurality of applications on the touch screen;
receiving a second gesture, the second gesture received through the touch screen interface of the portable electronic device while the device is in the first user account mode;
determining that the received second gesture meets a predetermined condition for a gesture to provide access to a second user account; and
in response to determining that the received second gesture meets the predetermined condition for a gesture to provide access to a second user account, changing the operational mode of the electronic device to provide access to a second plurality of applications on the device which are enabled for access under the second user account, and displaying icons associated with the second plurality of applications on the touch screen;
wherein the first plurality of applications includes one or more applications that are not within the second plurality of applications.

6. The method according to claim 5, including, receiving one or more inputs through the touch screen before the receiving of the first and second gestures, the one or more inputs identifying at least one application to be included in the first plurality of applications, and at least one application to be included in the second plurality of applications.

7. The method according to claim 6, including, receiving at least a plurality of inputs through the touch screen before the receiving of the first and second gestures, the plurality of inputs including:
a first input identifying the gesture to provide access to a first user account; and
a second input identifying the gesture to provide access to the second user account.

8. The method according to claim 5, including, while in the first user account mode, enabling partial access to an application in the first plurality of applications, wherein at least one function of the application is accessible and at least one other function of the application is inaccessible.

9. A portable electronic device comprising:
multiple user accounts
one or more processors; and
memory storing one or more programs, the one or more programs including instructions which, when executed by the one or more processors, cause the electronic device to:
receive a first gesture from a user, the first gesture received through a touch screen interface of the portable electronic device while the device is in a locked mode;
determine that the received first gesture meets a predetermined condition for a gesture to provide access to a first user account;
in response to determining that the received first gesture meets the predetermined condition for a gesture to provide access to a first user account, unlocking the electronic device and entering a first user account mode to provide access to a first plurality of applications on the device that are enabled for access under the first user account, and displaying icons associated with the first plurality of applications on the touch screen;
receive a second gesture, the second gesture received through the touch screen interface of the portable electronic device while the device is in the first user account mode;
determine that the received second gesture meets a predetermined condition for a gesture to provide access to a second user account; and
in response to determining that the received second gesture meets the predetermined condition for a gesture to provide access to a second user account, changing the operational mode of the electronic device to provide access to a second plurality of applications on the device which are enabled for access under the second user account, and displaying icons associated with the second plurality of applications on the touch screen;
wherein the first plurality of applications includes one or more applications that are not within the second plurality of applications.

10. The electronic device according to claim 9, wherein the operations include receiving one or more inputs through the touch screen before the receiving of the first and second gestures, the one or more inputs identifying at least one application to be included in the first plurality of applications, and at least one application to be included in the second plurality of applications.

11. The electronic device according to claim 10, wherein the operations include receiving at least a plurality of inputs through the touch screen before the receiving of the first and second gestures, the plurality of inputs including:
a first input identifying the gesture to provide access to a first user account; and
a second input identifying the gesture to provide access to the second user account.

12. The electronic device according to claim 9, wherein the operations include, while in the first user account mode, enabling partial access to an application in the first plurality of applications, wherein at least one function of the application is accessible and at least one other function of the application is inaccessible.

* * * * *